(12) United States Patent
Huo et al.

(10) Patent No.: US 11,501,322 B2
(45) Date of Patent: Nov. 15, 2022

(54) BLOCKCHAIN-BASED DATA PROCESSING SYSTEMS, METHODS, AND APPARATUSES

(71) Applicant: ALIPAY (HANGZHOU) INFORMATION TECHNOLOGY CO., LTD., Zhejiang (CN)

(72) Inventors: Xiangyang Huo, Hangzhou (CN); Yushen Ma, Hangzhou (CN); Tiantian Li, Hangzhou (CN); Longlong He, Hangzhou (CN); Mingli Wang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,556

(22) Filed: Jun. 30, 2021

(65) Prior Publication Data

US 2021/0326912 A1   Oct. 21, 2021

(30) Foreign Application Priority Data

Aug. 21, 2020  (CN) .......................... 202010851183.3

(51) Int. Cl.
  *G06Q 30/02*   (2012.01)
  *G06Q 30/06*   (2012.01)
(52) U.S. Cl.
  CPC ..... *G06Q 30/0201* (2013.01); *G06Q 30/0641* (2013.01); *G06Q 2220/00* (2013.01)
(58) Field of Classification Search
  None
  See application file for complete search history.

(56) References Cited

U.S. PATENT DOCUMENTS 10,126,927 B1 *  11/2018  Fieldman ............. G06Q 10/107
10,304,082 B1 *   5/2019  Bhagat ............... G06Q 30/0255
(Continued)

FOREIGN PATENT DOCUMENTS

CN   108389129 A   8/2018
CN   109614438 A   4/2019
(Continued)

OTHER PUBLICATIONS

Drylewski et al. "As Interest in Blockchain Technology Grows, So Do Attempts at Guidance and Regulation" (2019) (https://www.skadden.com/insights/publications/2019/01/2019-insights/as-interest-in-blockchain-technology-grows) (Year: 2019).*
(Continued)

*Primary Examiner* — Sujay Koneru
(74) *Attorney, Agent, or Firm* — Fish & Richardson P.C.

(57) ABSTRACT

A service platform obtains order data of an order placed by a target user through a user interface and history data of the target user associated with one or more user interface operations for placing the order, where the history data includes page code of one or more pages of the user interface associated with the one or more user interface operations. The service platform generates, based on the history data and the order data, usage data of the target user. The service platform determines a digital digest of the usage data. The service platform sends the digital digest to a blockchain network associated with a blockchain, where the digital digest is verified by a blockchain node of the blockchain network, and where the digital digest is stored on the blockchain in response to a determination that the digital digest passes a verification.

17 Claims, 4 Drawing Sheets

(56) References Cited

U.S. PATENT DOCUMENTS

| | | | |
|---|---|---|---|
| 10,911,243 B1* | 2/2021 | Griffin | G06F 9/546 |
| 2002/0169953 A1* | 11/2002 | Moharram | H04L 63/12 |
| | | | 713/151 |
| 2003/0037127 A1* | 2/2003 | Shah | G06F 3/0665 |
| | | | 709/238 |
| 2004/0054908 A1* | 3/2004 | Circenis | G06F 21/645 |
| | | | 713/176 |
| 2004/0260649 A1* | 12/2004 | Kagehiro | G06Q 20/1085 |
| | | | 705/43 |
| 2009/0320000 A1* | 12/2009 | Saxe | G06F 11/3495 |
| | | | 717/128 |
| 2010/0005512 A1* | 1/2010 | Wahl | H04L 63/08 |
| | | | 726/4 |
| 2011/0295761 A1* | 12/2011 | Sudo | G06F 40/174 |
| | | | 705/342 |
| 2012/0109710 A1* | 5/2012 | Rahman | G06F 16/9535 |
| | | | 705/7.31 |
| 2012/0144022 A1* | 6/2012 | Porter | G06Q 30/0201 |
| | | | 709/224 |
| 2013/0041837 A1* | 2/2013 | Dempski | G06Q 30/0201 |
| | | | 705/345 |
| 2013/0191348 A1* | 7/2013 | Vahabzadegan | G06F 21/10 |
| | | | 707/E17.101 |
| 2013/0339473 A1* | 12/2013 | McCaffrey | H04L 49/90 |
| | | | 709/216 |
| 2014/0012937 A1* | 1/2014 | Thomson | G06F 16/9574 |
| | | | 709/213 |
| 2014/0042218 A1* | 2/2014 | Grossman | G06Q 30/0601 |
| | | | 235/487 |
| 2015/0227406 A1* | 8/2015 | Jan | G06F 11/0709 |
| | | | 714/37 |
| 2015/0332386 A1* | 11/2015 | Pappas | G06Q 30/0269 |
| | | | 705/14.66 |
| 2016/0110469 A1* | 4/2016 | Ostroumova Prokhorenkova | G06F 16/958 |
| | | | 707/770 |
| 2016/0140019 A1* | 5/2016 | Bertin | G06F 9/5083 |
| | | | 717/128 |
| 2017/0140541 A1* | 5/2017 | Lu | G06K 9/00 |
| 2018/0053224 A1* | 2/2018 | McClave | H04L 67/22 |
| 2018/0075525 A1* | 3/2018 | Qin | G06Q 20/102 |
| 2018/0150384 A1* | 5/2018 | Alaranta | G06F 11/3017 |
| 2018/0189449 A1* | 7/2018 | Karumba | G16H 10/60 |
| 2018/0240152 A1* | 8/2018 | Mookherjee | G06Q 30/0256 |
| 2018/0349893 A1* | 12/2018 | Tsai | H04W 12/77 |
| 2019/0035431 A1* | 1/2019 | Attorre | G11B 27/036 |
| 2019/0068701 A1* | 2/2019 | Han | H04L 47/822 |
| 2019/0180338 A1* | 6/2019 | Swanson | G06N 5/04 |
| 2019/0228393 A1* | 7/2019 | Hu | G06Q 20/102 |
| 2019/0354607 A1* | 11/2019 | Snow | H04L 67/10 |
| 2019/0370886 A1* | 12/2019 | Han | G06Q 30/0635 |
| 2020/0175588 A1* | 6/2020 | Li | H04L 9/0643 |
| 2020/0213100 A1* | 7/2020 | Zhang | H04L 9/3239 |
| 2020/0279257 A1* | 9/2020 | Cheng | G06Q 20/3829 |
| 2020/0293515 A1* | 9/2020 | Wang | H04L 9/0825 |
| 2020/0295942 A1* | 9/2020 | Bartolucci | H04L 9/3215 |
| 2020/0302433 A1* | 9/2020 | Green | G06Q 20/4014 |
| 2020/0364183 A1* | 11/2020 | Zhou | G06F 16/134 |
| 2021/0004437 A1* | 1/2021 | Zhang | G06N 3/0454 |
| 2021/0042444 A1* | 2/2021 | Hwang | H04L 9/3297 |
| 2021/0192512 A1* | 6/2021 | Che | H04L 9/3247 |
| 2021/0223921 A1* | 7/2021 | Song | G06F 40/169 |
| 2021/0241321 A1* | 8/2021 | Downing | H04N 5/76 |
| 2021/0326912 A1* | 10/2021 | Huo | G06Q 30/0641 |

FOREIGN PATENT DOCUMENTS

| | | | | |
|---|---|---|---|---|
| CN | 110084069 A | | 8/2019 | |
| CN | 110149361 A | | 8/2019 | |
| CN | 109598505 B | * | 5/2020 | ....... G06Q 10/06395 |
| CN | 111241157 A | | 6/2020 | |
| CN | 111274105 A | | 6/2020 | |
| CN | 111428278 A | | 7/2020 | |
| CN | 111488259 A | | 8/2020 | |
| CN | 111539813 A | | 8/2020 | |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

BLOCKCHAIN-BASED DATA PROCESSING SYSTEMS, METHODS, AND APPARATUSES

CROSS-REFERENCE TO RELATED APPLICATIONS

This application claims priority to Chinese Patent Application No. 202010851183.3, filed on Aug. 21, 2020, which is hereby incorporated by reference in its entirety.

TECHNICAL FIELD

The present specification relates to the field of compliance data management, and in particular, to blockchain-based data processing systems, methods, and apparatuses.

BACKGROUND

With development and popularization of Internet technologies, more users choose to shop online. Unlike traditional real world shopping, users can complete shopping, booking, stock trading, and document application through the Internet, which greatly improves convenience for the users. With deepening of online services, information security and information protection became the most important issues. While ensuring user information security, it is also necessary to ensure that no loss will be caused on a server by a violation operation of a user, so as to promote continuous development of online services. In this process, it may be necessary to backtrack pages browsed by the user or operations performed by the user. For example, in an after-sales scenario, it may be necessary to backtrack an operation process of buying a product by a user or a payment process, to analyze whether it was the user or the merchant that has a problem and provide a result. However, content that needs to be backtracked is usually collected and stored by the server. The unilateral storage of evidence has a problem of low credibility. Therefore, an effective solution is urgently needed to solve this problem.

SUMMARY

In view of this, embodiments of the present specification provide blockchain-based data processing systems. The present specification also relates to blockchain-based data processing methods, blockchain-based data processing apparatuses, computing devices, and computer-readable storage media, to solve technical disadvantages in the existing technology.

According to a first aspect, some embodiments of the present specification provide a blockchain-based data processing system, including: a service platform and at least one blockchain node, where the service platform is configured to obtain history data of a target user browsing a resource management website and order data of a resource order completed by using the resource management website; generate, based on the history data and the order data, usage data of the target user using the resource management website; and determine a digital digest of the usage data, and upload the digital digest to the at least one blockchain node; and the at least one blockchain node is configured to receive the digital digest uploaded by the service platform; synchronize the digital digest to a target blockchain node on a blockchain for verification; and store the digital digest in a corresponding block if the digital digest passes the verification.

Optionally, the service platform is further configured to: receive an operation request submitted by the target user for a current display page at the resource management website; determine target page code corresponding to the operation request, and send the target page code to the target user; generate a target key frame based on the target page code and a time of sending the target page code; determine a storage block created during browsing of the resource management website by the target user, write the target key frame to the storage block, and update a record identifier of the storage block; and if a closing instruction submitted by the target user for the resource management website is received, determine the history data and the order data based on the storage block.

Optionally, the service platform is further configured to: receive a website obtaining request uploaded by the target user, where the website obtaining request includes a user identifier of the target user and a website identifier of the resource management website; determine initial page code based on the website identifier, and send the initial page code to the target user; generate an initial key frame based on the initial page code and a time of sending the initial page code; and create the storage block based on the initial key frame, and generate the record identifier based on the user identifier and the website identifier.

Optionally, the service platform is further configured to: process the usage data by using a predetermined hash function, to obtain a hash value corresponding to the usage data, use the hash value as the digital digest of the usage data, and send the hash value to the at least one blockchain node.

Optionally, the service platform is further configured to: obtain a user identifier of the target user by parsing the order data; and determine, based on the user identifier, storage space corresponding to the target user, and write the usage data to the storage space.

Optionally, the service platform is further configured to: if a backtracking request for backtracking a process of using the resource management website by the target user is received, read, based on the backtracking request, usage data to be verified from the storage space corresponding to the target user, and determine a target digital digest of the usage data to be verified; upload a request for obtaining the digital digest to the at least one blockchain node, and receive the digital digest returned by the at least one blockchain node; and compare the target digital digest with the digital digest, and determine a response result for the backtracking request based on a comparison result.

Optionally, the service platform is further configured to: if the response result is that the target digital digest is consistent with the digital digest, parse the usage data to obtain the history data; generate, based on the history data, an operation page indicating an operation of the target user in the use of the resource management website, and determine behavior information of the target user based on the operation page; and perform behavior detection on the target user based on the behavior information to obtain a behavior detection result of the target user.

Optionally, the service platform is further configured to: parse the history data to obtain an operation key frame indicating an operation of the target user in the use of the resource management website; and parse the operation key frame to obtain operation page code, and generate the operation page based on the operation page code.

Optionally, the service platform is further configured to: if a backtracking request for backtracking a process of using the resource management website by the target user is received, generate, based on the history data, a plurality of operation pages indicating operations of the target user in the use of the resource management website; and sort the plurality of operation pages based on a time sequence of using the resource management website by the target user, and generate an operation page display sequence based on a sorting result.

According to a second aspect, some embodiments of the present specification provide a blockchain-based data processing method, applied to a service platform and including: obtaining history data of a target user browsing a resource management website and order data of a resource order completed by using the resource management website; generating, based on the history data and the order data, usage data of the target user using the resource management website; and determining a digital digest of the usage data, and writing the digital digest to a blockchain.

According to a third aspect, some embodiments of the present specification provide a blockchain-based data processing apparatus, applied to a service platform and including: an obtaining module, configured to obtain history data of a target user browsing a resource management website and order data of a resource order completed by using the resource management website; a generation module, configured to generate, based on the history data and the order data, usage data of the target user using the resource management website; and a determining module, configured to determine a digital digest of the usage data, and write the digital digest to a blockchain.

According to a fourth aspect, some embodiments of the present specification provide a computing device, including: a memory and a processor, where the memory is configured to store a computer-executable instruction, and the processor is configured to execute the computer-executable instruction to: obtain history data of a target user browsing a resource management website and order data of a resource order completed by using the resource management website; generate, based on the history data and the order data, usage data of the target user using the resource management website; and determine a digital digest of the usage data, and writing the digital digest to a blockchain.

According to a fifth aspect, some embodiments of the present specification provide a computer-readable storage medium, where the computer-readable storage medium stores a computer-executable instruction, and when the instruction is executed by a processor, steps of the blockchain-based data processing method are implemented.

In the blockchain-based data processing system provided in the embodiments, if the service platform obtains the history data of the target user browsing the resource management website and the order data of the resource order completed by using the resource management website, the usage data of the target user using the resource management website is generated based on the history data and the order data, and the digital digest of the usage data is determined and uploaded to the at least one blockchain node; and the blockchain node invites other blockchain nodes to verify the digital digest, and stores the digital digest in the corresponding block if the digital digest passes the verification. As such, the history data and order data of the target user are stored in the blockchain, and based on the non-tamperability and decentralization characteristics of the blockchain, credibility of the stored data is improved, a risk of tampering and forging is reduced, and user experience is further improved.

DESCRIPTION OF EMBODIMENTS

In the following description, plenty of specific details are described to help fully understand the present specification. However, the present specification can be implemented in a plurality of other methods different from those described here, and a person skilled in the art can make similar extensions without departing from the essence of the present specification. Therefore, the present specification is not limited by the specific implementations disclosed below.

Terms used in one or more embodiments of the present specification are merely used to describe specific embodiments, and are not intended to limit the one or more embodiments of the present specification. The terms "a" and "the" of singular forms used in one or more embodiments of the present specification and the appended claims are also intended to include plural forms, unless otherwise specified in the context clearly. It should also be understood that the term "and/or" used in one or more embodiments of the present specification indicates and includes any or all possible combinations of one or more associated listed items.

It should be understood that although terms "first", "second", etc. may be used in one or more embodiments of the present specification to describe various types of information, the information is not limited to these terms. These terms are only used to differentiate between information of the same type. For example, without departing from the scope of one or more embodiments of the present specification, "first" can also be referred to as "second", and similarly, "second" can also be referred to as "first". Depending on the context, for example, the word "if" used here can be interpreted as "while", "when", or "in response to determining".

The present specification provides blockchain-based data processing systems. In addition, the present specification also relates to blockchain-based data processing methods, blockchain-based data processing apparatuses, computing devices, and computer-readable storage media. Detailed descriptions are provided successively in the following embodiments.

In practical applications, with the development of Internet technologies and improvement of management requirements, relatively complete backtracking mechanisms have been established for all kinds of business, to fulfill appropriate management obligations and undertake the burden of proof. However, although a server can retain a trace of a user operation process, a problem of low credibility may occur because evidence is stored on the server unilaterally. For a user, the server may be suspected of tampering and forging, and the credibility of the evidence provided is also low.

Therefore, it is necessary to ensure that content of the backtracking is not tampered with or forged, and improve the credibility.

Figure 1:
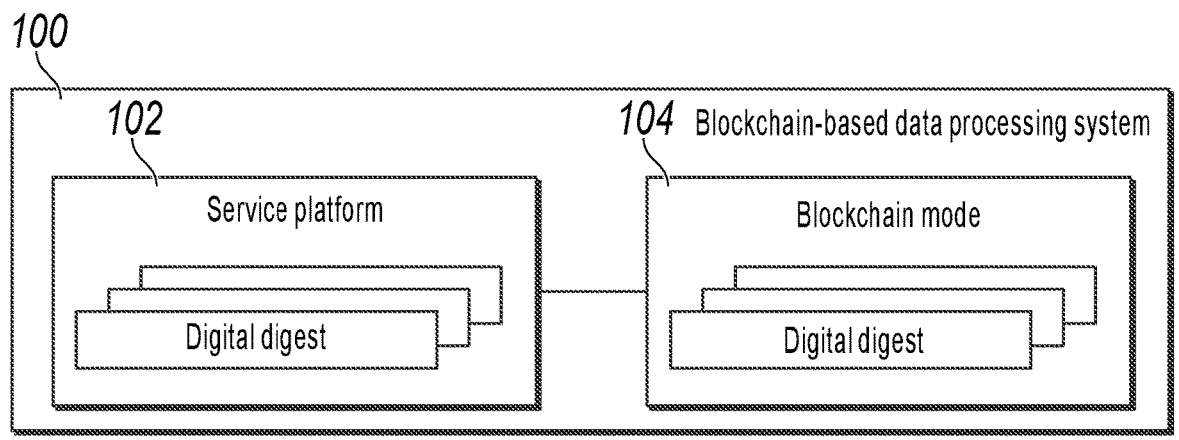
FIG. 1 is a schematic diagram illustrating a blockchain-based data processing system according to some embodiments of the present specification.

FIG. 1 is a schematic diagram illustrating a blockchain-based data processing system according to some embodiments of the present specification. The system 100 includes a service platform 102 and at least one blockchain node 104.

The service platform 102 is configured to obtain history data of a target user browsing a resource management website and order data of a resource order completed by using the resource management website; generate, based on the history data and the order data, usage data of the target user using the resource management website; and determine a digital digest of the usage data, and upload the digital digest to the at least one blockchain node 104.

The at least one blockchain node 104 is configured to receive the digital digest uploaded by the service platform 102; synchronize the digital digest to a target blockchain node on a blockchain for verification; and store the digital digest in a corresponding block if the digital digest passes the verification.

In the blockchain-based data processing system provided in the embodiments, to improve credibility of data and reduce a risk of data tampering and forging, if the service platform obtains the history data of the target user browsing the resource management website and the order data of the resource order completed by using the resource management website, the usage data of the target user using the resource management website is generated based on the history data and the order data, and the digital digest of the usage data is determined and uploaded to the at least one blockchain node; and the blockchain node invites other blockchain nodes to verify the digital digest, and stores the digital digest in the corresponding block if the digital digest passes the verification. As such, the history data and order data of the target user are stored in the blockchain, and based on the non-tamperability and decentralization characteristics of the blockchain, credibility of the data stored as evidence is improved, a risk of tampering and forging is reduced, and user experience is further improved.

In specific implementation, the service platform is specifically a platform providing a service for a user, and the provided service is implemented by using the resource management website, such as an online shopping service, a stock trading service, or a booking service. Correspondingly, the resource management website is specifically a website used when the user obtains the service. By using the website, the user can perform online shopping, stock trading, booking, etc. The history data specifically refers to tracks of all operations performed by the target user when the target user uses the resource management website, that is, all operations performed by the target user when using the resource management website in a period from opening the resource management website to closing the resource management website, for example, a browsing operation performed on a corresponding page of the website, a paying operation, or an inputting operation. The history data includes operation pages after the target user operates the pages provided by the resource management website. As such, all the operations performed by the user by using the resource management website are recorded by using the operation pages.

Further, the order data is specifically data corresponding to the order completed by the target user by using the resource management website. When the target user browses the resource management website, the target user may make payment or may not make payment through the website. If the target user does not perform a payment operation through the website, a subsequent problem such as a dispute will not be caused. Therefore, for a non-payment operation, only backtracking is needed, and there is no need to record the operation. If the target user performs a payment operation through the website, a subsequent problem of providing evidence may occur. Therefore, the usage data including the order data needs to be stored in the blockchain, to ensure credibility of the data.

Still further, the usage data is specifically a data set including the history data and the order data that are generated when the target user uses the resource management website. The digital digest is specifically a character string generated after an operation is performed on the usage data, and the digital digest is finally stored in the blockchain, thereby improving credibility while ensuring non-tampering of the usage data. When it is necessary to backtrack a process of using the resource management website by the target user, an operation can be performed after the usage data is obtained, and consistency between the obtained digital digest and the uploaded digital digest is determined. Therefore, it can be determined whether the data is tampered with and whether the data can be used as evidence.

Notably, uploading the digest of the usage data to the blockchain that the at least one blockchain node belongs to can not only ensure security of the data but also ensure authenticity of the data, implement authenticity verification of the data, and implement customer inquiry of the data. Closed-loop management of trusted evidence storage can be implemented, and user experience can be further improved.

The blockchain-based data processing system provided in the embodiments can be used not only for storage of data as evidence, but also for the use of regulations, so that a regulatory authority having corresponding rights can capture data, determine whether the service of the resource management website complies with regulations. Notably, the regulatory authority can capture data only after passing qualification certification. A manner of qualification certification can be providing a corresponding certification document or reaching a certification condition, or the like, and is not limited here in the embodiments.

For example, user U1 buys product A by using a shopping website, and the process of buying product A by user U1 is entering a homepage of the shopping website, clicking a widget corresponding to product A, entering a sales page of product A, and generating a payment window by clicking a payment widget of the sales page. User U1 completes payment for product A through the payment window, and the user closes the shopping website upon completion of payment. A page displayed in the process and the operation process of the user are both history data of user U1 using the shopping website, and an order for buying product A is order data.

Based on this, to provide evidence in a later dispute, usage data of user U1 using the shopping website is generated based on the history data of the user U1 and the order data of buying product A, and a hash function is used to perform an operation on the usage data, to obtain a hash value {63143687b53f3d095c6d5dcc04b203dbcb769eb7f6094f0 2c4ad65add370ca87} corresponding to the usage data, and store the hash value in the blockchain. In this case, at least one blockchain node in the blockchain receives the hash value and then performs consensus verification on the hash value. If the verification succeeds, it indicates that the hash value can be stored in the blockchain normally. In this case, the hash value is written to a high-dimensional 58088055 block, and an evidence storage event 2020-03-04 19:30:19 is recorded. As such, the process of buying product A by user U1 through the shopping website is recorded, and evidence storage is performed through the blockchain. Therefore, credibility and non-tamperability of data are implemented.

However, before this, the process of using the resource management website by the target user also needs to be recorded. Generally, when the process of using the resource management website by the user is recorded, the recording is implemented in a screen recording or human-computer interaction mode. However, screen recording needs a lot of resources invocation, and visualization cannot be implemented in the human-computer interaction mode. Therefore, to reduce resource occupation and improve traceability of the resource management website, underlying code can be recorded for implementation. In the embodiments, the specific implementation is as follows:

The service platform 102 is further configured to: receive a website obtaining request uploaded by the target user, where the website obtaining request includes a user identifier of the target user and a website identifier of the resource management website; determine initial page code based on the website identifier, and send the initial page code to the target user; generate an initial key frame based on the initial page code and a time of sending the initial page code; and create the storage block based on the initial key frame, and generate the record identifier based on the user identifier and the website identifier.

Specifically, the website obtaining request is specifically a request uploaded by the target user through a client device, for using the resource management website. The website identifier is specifically a unique identifier of the resource management website, and can be a URL of the resource management website, so that the service platform can determine, based on the identifier, the website that the target user needs to browse. The user identifier is specifically a unique identifier corresponding to the target user.

The initial page code is specifically code corresponding to the homepage of the resource management website, that is, the underlying code needed by a browser to construct the homepage. The time of sending the initial page code is specifically a time of sending the initial page code by the service platform to the target user. The initial key frame is specifically related information generated based on the sending time and the initial page code. The storage block is specifically a key frame set. The record identifier is specifically a corresponding identifier for recording a series of operations of the target user this time and the record identifier corresponds to the storage block. As the key frames in the storage block increase, the record identifier is also updated. After the series of operations are completed, the record identifier is no longer updated, and the record identifier is stored so that the page code of the corresponding page of the resource management website used by the target user in a certain period of time can be read based on the record identifier in the future. As such, the relevant page can be backtracked, and then the corresponding service process can be performed.

Based on this, after receiving the website obtaining request uploaded by the target user, the service platform determines to generate the initial page code of the homepage of the resource management website based on the website identifier included in the website obtaining request, and sends the initial page code to the target user; then generates the initial key frame based on the sending time and the initial page code; and finally, creates the storage block based on the initial key frame, and generates the record identifier based on the user identifier and the website identifier, so that reverse generation of the homepage can be subsequently completed based on the code.

Still further, after the storage block and the record identifier are created, each operation of the target user on a display page is recorded. In the embodiments, the operation process of the target user on the current display page is recorded. For the method of recording the process of page operations of the target user on the resource management website at any stage, references can be made to the corresponding descriptions of the embodiments. Details are omitted here. The specific implementation is as follows:

The service platform 102 is further configured to:

receive an operation request submitted by the target user for a current display page at the resource management website; determine target page code corresponding to the operation request, and send the target page code to the target user; generate a target key frame based on the target page code and a time of sending the target page code; determine a storage block created during browsing of the resource management website by the target user, write the target key frame to the storage block, and update a record identifier of the storage block; and if a closing instruction submitted by the target user for the resource management website is received, determine the history data and the order data based on the storage block.

Specifically, the current display page is specifically the page currently being browsed by the target user. The operation request is specifically a request for performing an operation by the target user through the current display page. The target page code is specifically the code corresponding to the operation request. If the operation request is a request for jumping to another page after content on the current display page is clicked, the target page code is code corresponding to the page to be jumped to. If the operation request is a request for displaying other content through a window after the content on the current display page is clicked, the target page code is code corresponding to the content displayed through the window.

Based on this, after sending the target page code to the target user, the service platform generates the target key frame based on the target page code and the time of sending the target page code, writes the target key frame to the storage block corresponding to the resource management website, and updates the record identifier of the storage block. In this case, recording of the process of operating the current display page at the resource management website by the target user is completed. Subsequently, if the closing instruction submitted by the target user for the resource management website is received, it indicates that the target user does not need to use the resource management website any longer, that is, the history data and the order data can be determined based on the key frame in the storage block.

For example, when user U1 needs to buy a product at shopping website T through a computer, a website obtaining request uploaded by user U1 to the service platform through the computer is received, where the request includes a website identifier ID_T corresponding to the shopping website T and the user identifier ID_U1 of user U1. The service platform then determines page code corresponding to a homepage of the shopping website T based on the website identifier ID_T and sends the page code corresponding to the homepage of the shopping website T to the computer of user U1 for displaying, so that user U1 goes shopping.

Moreover, for backtracking the operation of user U1 during shopping when a subsequent after-sales dispute arises, an initial key frame is generated based on the page code corresponding to the homepage of the shopping website T and the time of sending the code to user U1, and a storage block is created based on the initial key frame to record the code corresponding to the page change process caused by all operations when user U1 goes shopping through the shopping website T. In addition, a record identifier of the storage block is generated based on the user identifier ID_U1 of user U1 and the website identifier ID_T. Every time a new key frame is written to the storage block, the record identifier is updated. After user U1 closes the shopping website T, the record identifier is no longer updated, and is stored in a metadata table for subsequent use.

If a view request submitted by user U1 for product A through the homepage of the shopping website T is received, it indicates that user U1 needs to view product details of product A. In this case, the service platform determines to send product details page code of product A to the computer of user U1, to generate a product details page of product A for displaying to user U1. In this case, the service platform further needs to record the product details page code of product A, generate a key frame based on the product details page code of product A and the time of sending the code, write the key frame to the storage block, and update the record identifier, to record the process of viewing product A by user U1.

In summary, by recording the code, the service platform retains a trace of the operation of the target user using the resource management website, thereby greatly reducing an amount of stored data, and achieving high traceability for page backtracking by using the code, which further ensures that the backtracked page is the page operated by the target user and further guarantees the rights and interests of all parties.

In the embodiments, in the process of determining the digital digest of the usage data, the service platform 102 can calculate the hash value of the usage data by using the hash function, and store the hash value in the blockchain. The specific implementation is as follows:

The service platform 102 is further configured to process the usage data by using a predetermined hash function, to obtain the hash value corresponding to the usage data, use the hash value as the digital digest of the usage data, and send the hash value to the at least one blockchain node.

Still further, after the service platform 102 finishes storing the digital digest in the blockchain, the usage data also needs to be stored. For differentiated processing, the usage data needs to be written to the storage space corresponding to the target user. In the embodiments, the specific implementation is as follows:

The service platform 102 is further configured to obtain the user identifier of the target user by parsing the order data; and determine, based on the user identifier, the storage space corresponding to the target user, and write the usage data to the storage space.

Specifically, because operations of different users using the resource management website are different, the history data is also different. In addition, to facilitate management, the usage data including the order data and the history data needs to be separately managed, and needs to be used for subsequent backtracking. Therefore, storage space can be created for each target user based on the user identifier, and corresponding usage data can be written to the corresponding storage space, thereby implementing convenient management and improving traceability.

Notably, the storage space can not only store the usage data of the resource management website, but also store usage data of other resource management websites used by the target user. Only a metadata table needs to be created for the storage space. During backtracking, corresponding usage data can be extracted based on the metadata table for backtracking. In addition, there is an upper limit for the memory of the storage space. After the memory reaches the upper limit, historical usage data can be cleared, but the clearing can be implemented only after authorization by the regulatory authority, to ensure backtracking of the usage data of the target user in a limited time.

In addition, on one hand, when it is necessary to backtrack the process of using the resource management website by the target user, it indicates that the target user may be involved in a dispute. In this case, the service platform needs to provide evidence for the process of using the resource management website by the target user, so that the party responsible for the dispute is determined. To facilitate processing of the related service, an operation track of the user can be generated in a time-ordered way. In the embodiments, the specific implementation is as follows:

The service platform 102 is further configured to: if a backtracking request for backtracking the process of using the resource management website by the target user is received, generate, based on the history data, a plurality of operation pages indicating operations of the target user in the use of the resource management website; and sort the plurality of operation pages based on a time sequence of using the resource management website by the target user, and generate an operation page display sequence based on a sorting result.

Specifically, the backtracking request is specifically a request for backtracking the process of using the resource management website by the target user, and the plurality of operation pages are specifically the pages operated by the target user when the target user browses the resource management website.

Based on this, if the backtracking request for backtracking the process of using the resource management website by the target user is received, it indicates that the target user may have a dispute. In this case, it is necessary to backtrack the process of using the resource management website by the target user, to provide evidence. First, the history data is extracted, then the plurality of operation pages are generated based on the history data, and finally the plurality of operation pages are sorted based on the time of using the resource management website by the target user, to obtain the display sequence. The display sequence is specifically the result of sorting each operation page based on a certain sequence.

Figure 2:
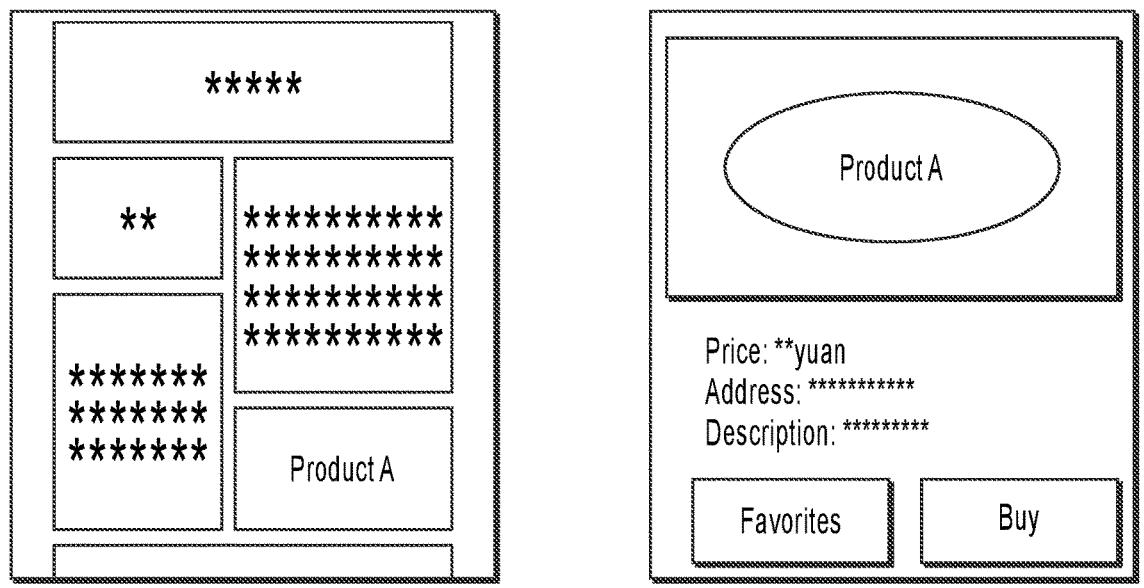
FIG. 2 is a schematic diagram illustrating an operation page in a blockchain-based data processing system according to some embodiments of the present specification.
Figure 3:
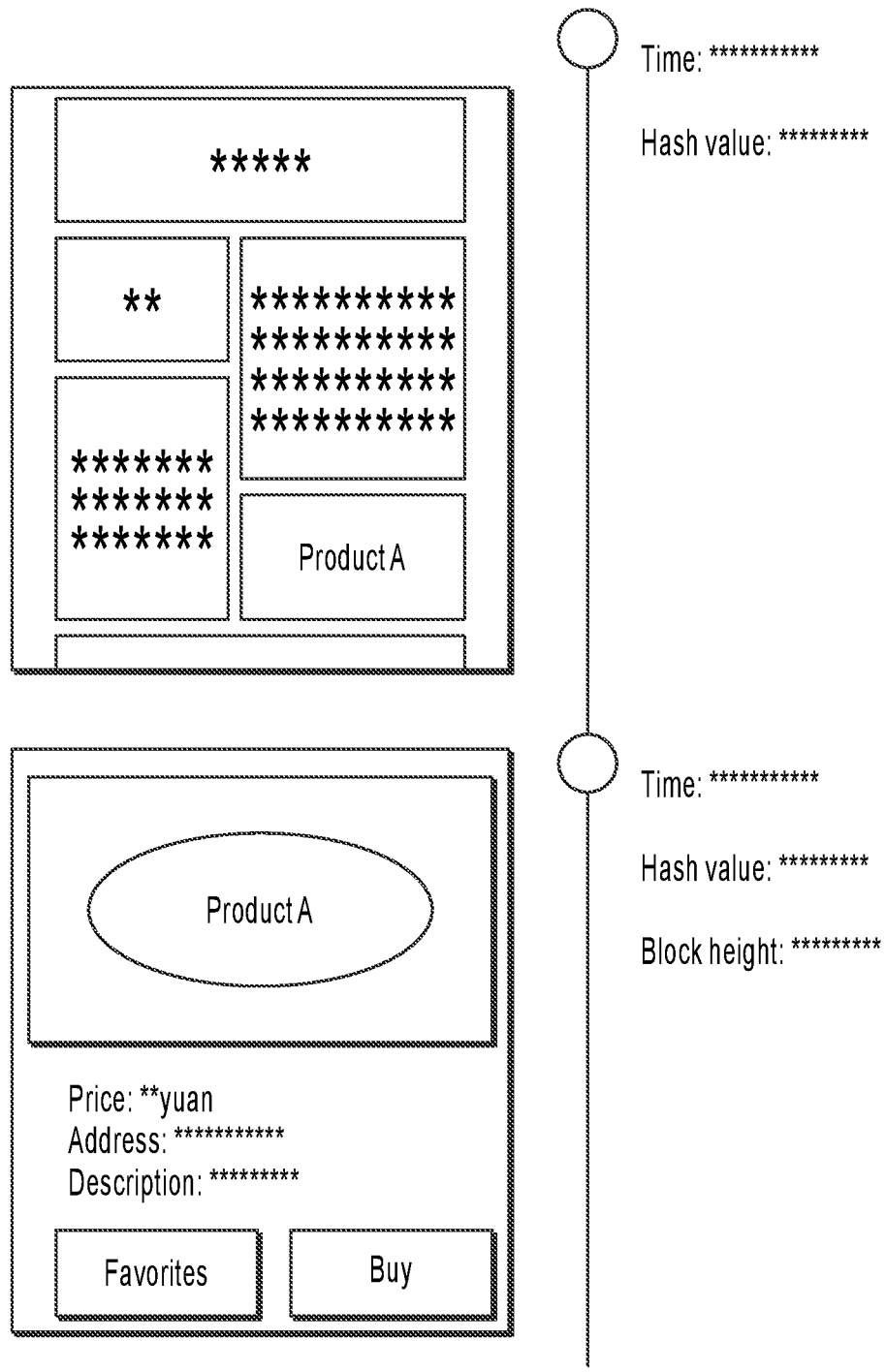
FIG. 3 is a schematic diagram illustrating a display sequence in a blockchain-based data processing system according to some embodiments of the present specification.

Still using the previous example, when user U1 has a dispute with the merchant of product A, the shopping platform backtracks the process of buying product A by user U1, extracts the history data of user U1 using the shopping website, and generates a browsing process of browsing each page at the website by user U1. The operation page of the shopping website browsed by user U1 is shown in FIG. 2. To facilitate viewing by the regulatory authority, the operation pages are sorted based on the time sequence, and the display sequence shown in FIG. 3 is generated. Therefore, each operation page is sorted in a column to improve visualization.

In summary, to improve visualization and help the regulatory authority more intuitively understand the process of using the resource management website by the target user after evidence is provided, a plurality of operation pages are generated based on the history data, and the plurality of operation pages are sorted to generate the display sequence to further improve the experience of the regulatory authority.

On the other hand, to improve credibility of backtracking content of backtracking the use of the resource management website by the target user, authenticity of data to be verified can also be verified to improve security of the backtracking scenario. In the embodiments, the specific implementation is as follows:

The service platform 102 is further configured to: if a backtracking request for backtracking the process of using the resource management website by the target user is received, read, based on the backtracking request, usage data to be verified from the storage space corresponding to the target user, and determine a target digital digest of the usage data to be verified; upload a request for obtaining the digital digest to the at least one blockchain node, and receive the digital digest returned by the at least one blockchain node; and compare the target digital digest with the digital digest, and determine a response result for the backtracking request based on a comparison result.

Further, the service platform 102 is further configured to: if the response result is that the target digital digest is consistent with the digital digest, parse the usage data to obtain the history data; generate, based on the history data, an operation page indicating an operation of the target user in the use of the resource management website, and determine behavior information of the target user based on the operation page; and perform behavior detection on the target user based on the behavior information to obtain a behavior detection result of the target user.

Specifically, the usage data to be verified is the history data of the target user using the resource management website and the order data that are extracted based on the backtracking request, but the extracted data has not been verified. If the verification fails, it indicates that the history data and the order data may be tampered with or forged. In this case, even if this part of data is used later, the data does not meet a condition for producing evidence. If the verification succeeds, it indicates that the history data and the order data have not been tampered with, and the history data and the order data are the data used to generate the usage data. In this case, this part of data can be used for producing evidence to complete processing of the related service.

Based on this, in the verification process, the method of determining the digital digest of the usage data is used to determine the target digital digest of the data to be verified. As such, the target digital digest can be compared with the digital digest, and the response result for the backtracking request is determined based on the comparison result.

Further, if the response result is that the target digital digest is inconsistent with the digital digest, it indicates that the usage data to be verified has been tampered with. In this case, the credibility is reduced, and the usage data cannot be used. If the response result is that the target digital digest is consistent with the digital digest, it indicates that the usage data to be verified has not been tampered with. In this case, the history data can be parsed to generate the operation page indicating an operation of the target user in the use of the resource management website, and the behavior information of the target user is determined based on the operation page; and further, whether the behavior of the target user complies with regulations is analyzed based on the behavior information to determine the party responsible for the dispute, where the behavior information is specifically operation behavior of using the resource management website by the target user and is used to analyze whether the target user has non-compliant operations, etc.

Still further, in the process of parsing the history data to generate the operation page, to reduce the amount of data in backtracking, the method of recording the page code is used. Therefore, when the operation page is generated, the operation page can also be generated based on the operation page code. In the embodiments, the specific implementation is as follows:

The service platform 102 is further configured to: parse the history data to obtain an operation key frame indicating an operation of the target user in the use of the resource management website; and parse the operation key frame to obtain the operation page code, and generate the operation page based on the operation page code.

Still using the previous example, when user U1 has a dispute with the merchant of product A, the shopping platform backtracks the process of buying product A by user U1, determines, based on a backtracking request for backtracking the use of the shopping website by user U1, the usage data to be verified, determines, by using the hash function, that a first hash value of the usage data to be verified is {63143687b53f3d095c6d5dcc04b203dbcb769eb7f6094f0 2c4ad65add370ca87}, and obtains an uploaded second hash value {63143687b53f3d095c6d5dcc04b203dbcb769eb7f6094f0 2c4ad65add370ca87} from the blockchain. In this case, the first hash value is compared with the second hash value to determine that the usage data has not been tampered with or forged, and the usage data can be used for producing evidence for the dispute. Then the history data of user U1 using the shopping website to buy product A is parsed, to generate an operation page when user U1 buys product A, and it is determined, by using the operation page, that user U1 buys product A in accordance with normal procedures, and no violation has occurred. In this case, it can be preliminarily determined that the party responsible for the dispute may be the merchant, and then further processing can be performed.

In summary, in the process of performing backtracking, to improve the credibility, the method of calculating the digital digest for verification is used to verify the security of the usage data, and further improve the credibility of the sales scenario, so as to protect the rights and interests of all parties.

In the blockchain-based data processing system provided in the embodiments, if the service platform obtains the history data of the target user browsing the resource management website and the order data of the resource order completed by using the resource management website, the usage data of the target user using the resource management website is generated based on the history data and the order data, and the digital digest of the usage data is determined and uploaded to the at least one blockchain node; and the blockchain node invites other blockchain nodes to verify the digital digest, and stores the digital digest in the corresponding block if the digital digest passes the verification. As such, the history data and order data of the target user are stored in the blockchain, and based on the non-tamperability and decentralization characteristics of the blockchain, credibility of the data stored as evidence is improved, a risk of tampering and forging is reduced, and user experience is further improved.

Figure 4:
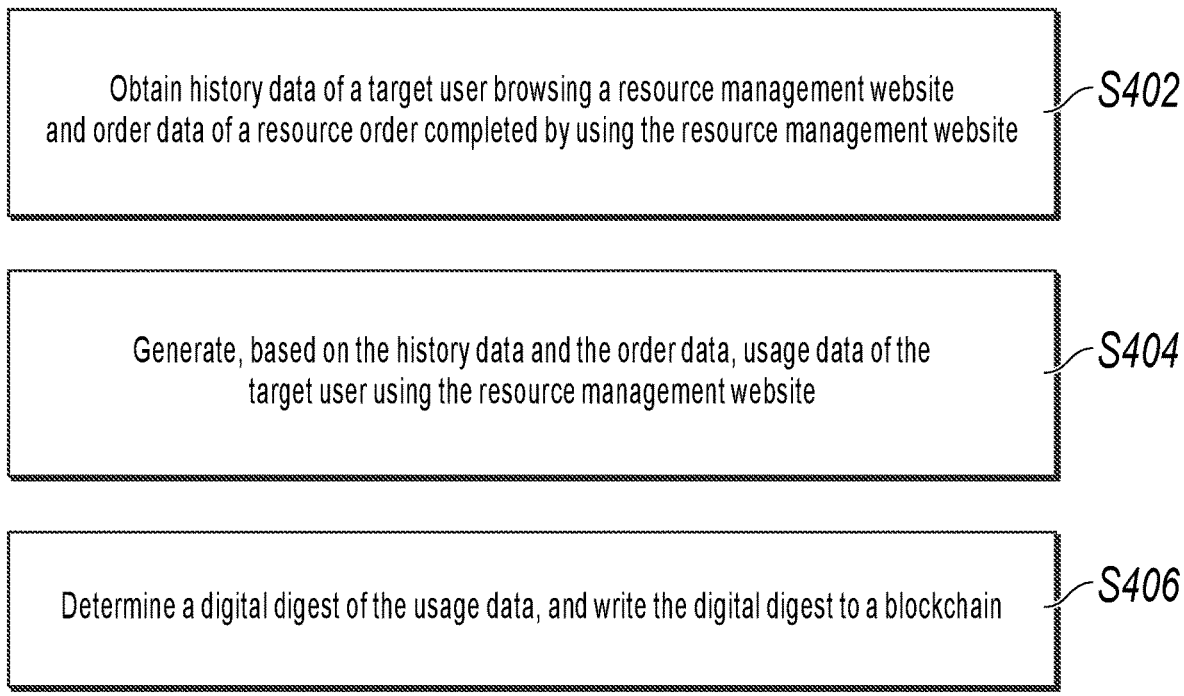
FIG. 4 is a flowchart illustrating a blockchain-based data processing method according to some embodiments of the present specification.

FIG. 4 is a flowchart illustrating a blockchain-based data processing method according to some embodiments of the present specification. Specifically, the method includes the following steps.

Step S402: Obtain history data of a target user browsing a resource management website and order data of a resource order completed by using the resource management website.

Step S404: Generate, based on the history data and the order data, usage data of the target user using the resource management website.

Step S406: Determine a digital digest of the usage data, and write the digital digest to a blockchain.

In one or more implementations of the embodiments, before the step of obtaining history data of a target user browsing a resource management website, the method further includes:

receiving an operation request submitted by the target user for a current display page at the resource management website;

determining target page code corresponding to the operation request, and sending the target page code to the target user;

generating a target key frame based on the target page code and a time of sending the target page code;

determining a storage block created during browsing of the resource management website by the target user, writing the target key frame to the storage block, and updating a record identifier of the storage block; and if a closing instruction submitted by the target user for the resource management website is received, determining the history data and the order data based on the storage block.

In one or more implementations of the embodiments, the method further includes:

receiving a website obtaining request uploaded by the target user, where the website obtaining request includes a user identifier of the target user and a website identifier of the resource management website;

determining initial page code based on the website identifier, and sending the initial page code to the target user;

generating an initial key frame based on the initial page code and a time of sending the initial page code; and creating the storage block based on the initial key frame, and generating the record identifier based on the user identifier and the website identifier.

In one or more implementations of the embodiments, the determining a digital digest of the usage data, and writing the digital digest to a blockchain includes:

processing the usage data by using a predetermined hash function, to obtain a hash value corresponding to the usage data, using the hash value as the digital digest of the usage data, and writing the hash value to the blockchain.

In one or more implementations of the embodiments, the method further includes:

obtaining a user identifier of the target user by parsing the order data; and determining, based on the user identifier, storage space corresponding to the target user, and writing the usage data to the storage space.

In one or more implementations of the embodiments, the method further includes:

if a backtracking request for backtracking a process of using the resource management website by the target user is received, reading, based on the backtracking request, usage data to be verified from the storage space corresponding to the target user, and determining a target digital digest of the usage data to be verified;

uploading a request for obtaining the digital digest to the at least one blockchain node, and receiving the digital digest returned by the at least one blockchain node; and comparing the target digital digest with the digital digest, and determining a response result for the backtracking request based on a comparison result.

In one or more implementations of the embodiments, the method further includes:

if the response result is that the target digital digest is consistent with the digital digest, parsing the usage data to obtain the history data;

generating, based on the history data, an operation page indicating an operation of the target user in the use of the resource management website, and determining behavior information of the target user based on the operation page; and performing behavior detection on the target user based on the behavior information to obtain a behavior detection result of the target user.

In one or more implementations of the embodiments, the generating, based on the history data, an operation page indicating an operation of the target user in the use of the resource management website includes:

parsing the history data to obtain an operation key frame indicating an operation of the target user in the use of the resource management website; and parsing the operation key frame to obtain operation page code, and generating the operation page based on the operation page code.

In one or more implementations of the embodiments, the method further includes:

if a backtracking request for backtracking a process of using the resource management website by the target user is received, generating, based on the history data, a plurality of operation pages indicating operations of the target user in the use of the resource management website; and sorting the plurality of operation pages based on a time sequence of using the resource management website by the target user, and generating an operation page display sequence based on a sorting result.

Notably, the blockchain-based data processing method provided in the embodiments is applied to a service platform. For the corresponding description, references can be made to the corresponding description of the previous embodiments.

Details are omitted in the embodiments for simplicity.

In the blockchain-based data processing method provided in the embodiments, if the service platform obtains the history data of the target user browsing the resource management website and the order data of the resource order completed by using the resource management website, the usage data of the target user using the resource management website is generated based on the history data and the order data, and the digital digest of the usage data is determined and uploaded to the at least one blockchain node; and the blockchain node invites other blockchain nodes to verify the digital digest, and stores the digital digest in the corresponding block if the digital digest passes the verification. As such, the history data and order data of the target user are stored in the blockchain, and based on the non-tamperability and decentralization characteristics of the blockchain, credibility of the data stored as evidence is improved, a risk of tampering and forging is reduced, and user experience is further improved.

Figure 5:
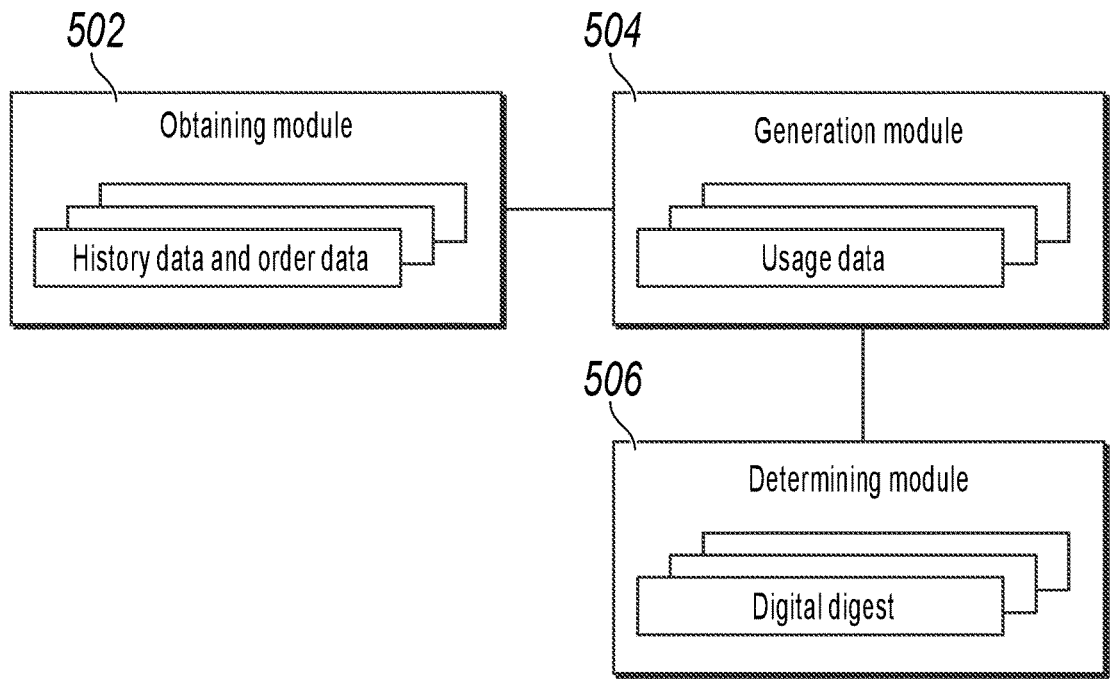
FIG. 5 is a schematic structural diagram illustrating a blockchain-based data processing apparatus according to some embodiments of the present specification.

Corresponding to the previous method embodiments, the present specification further provides embodiments of a blockchain-based data processing apparatus applied to a service platform. FIG. 5 is a schematic structural diagram illustrating a blockchain-based data processing apparatus according to some embodiments of the present specification. As shown in FIG. 5, the apparatus includes:

an obtaining module 502, configured to obtain history data of a target user browsing a resource management website and order data of a resource order completed by using the resource management website;

a generation module 504, configured to generate, based on the history data and the order data, usage data of the target user using the resource management website; and a determining module 506, configured to determine a digital digest of the usage data, and write the digital digest to a blockchain.

In one or more implementations of the embodiments, the blockchain-based data processing apparatus further includes:

a request receiving module, configured to receive an operation request submitted by the target user for a current display page at the resource management website;

a target page code sending module, configured to determine target page code corresponding to the operation request, and send the target page code to the target user;

a target key frame generation module, configured to generate a target key frame based on the target page code and a time of sending the target page code;

a storage block determining module, configured to determine a storage block created during browsing of the resource management website by the target user, write the target key frame to the storage block, and update a record identifier of the storage block; and a history data and order data determining module, configured to determine the history data and the order data based on the storage block if a closing instruction submitted by the target user for the resource management website is received.

In one or more implementations of the embodiments, the blockchain-based data processing apparatus further includes:

a website obtaining request receiving module, configured to receive a website obtaining request uploaded by the target user, where the website obtaining request includes a user identifier of the target user and a website identifier of the resource management website;

an initial page code determining module, configured to determine initial page code based on the website identifier, and send the initial page code to the target user;

an initial key frame generation module, configured to generate an initial key frame based on the initial page code and a time of sending the initial page code; and a record identifier generation module, configured to create the storage block based on the initial key frame, and generate the record identifier based on the user identifier and the website identifier.

In one or more implementations of the embodiments, the determining module 506 is further configured to:

process the usage data by using a predetermined hash function, to obtain a hash value corresponding to the usage data, use the hash value as the digital digest of the usage data, and write the hash value to the blockchain.

In one or more implementations of the embodiments, the blockchain-based data processing apparatus further includes:

an order data parsing module, configured to obtain a user identifier of the target user by parsing the order data; and a storage space determining module, configured to determine, based on the user identifier, storage space corresponding to the target user, and write the usage data to the storage space.

In one or more implementations of the embodiments, the blockchain-based data processing apparatus further includes:

a target digital digest determining module, configured to: if a backtracking request for backtracking a process of using the resource management website by the target user is received, read, based on the backtracking request, usage data to be verified from the storage space corresponding to the target user, and determine a target digital digest of the usage data to be verified;

an obtaining request uploading module, configured to upload a request for obtaining the digital digest to the at least one blockchain node, and receive the digital digest returned by the at least one blockchain node; and a response result determining module, configured to compare the target digital digest with the digital digest, and determine a response result for the backtracking request based on a comparison result.

In one or more implementations of the embodiments, the blockchain-based data processing apparatus further includes:

a usage data parsing module, configured to parse the usage data to obtain the history data if the response result is that the target digital digest is consistent with the digital digest;

a behavior information determining module, configured to generate, based on the history data, an operation page indicating an operation of the target user in the use of the resource management website, and determine behavior information of the target user based on the operation page; and a detection module, configured to perform behavior detection on the target user based on the behavior information to obtain a behavior detection result of the target user.

In one or more implementations of the embodiments, the behavior information determining module includes:

a parsing unit, configured to parse the history data to obtain an operation key frame indicating an operation of the target user in the use of the resource management website; and a key frame parsing unit, configured to parse the operation key frame to obtain operation page code, and generate the operation page based on the operation page code.

In one or more implementations of the embodiments, the blockchain-based data processing apparatus further includes:

a page generation module, configured to generate, based on the history data, a plurality of operation pages indicating operations of the target user in the use of the resource management website if a backtracking request for backtracking a process of using the resource management website by the target user is received; and a display module, configured to sort the plurality of operation pages based on a time sequence of using the resource management website by the target user, and generate an operation page display sequence based on a sorting result.

In the blockchain-based data processing apparatus provided in the embodiments, if the service platform obtains the history data of the target user browsing the resource management website and the order data of the resource order completed by using the resource management website, the usage data of the target user using the resource management website is generated based on the history data and the order data, and the digital digest of the usage data is determined and uploaded to the at least one blockchain node; and the blockchain node invites other blockchain nodes to verify the digital digest, and stores the digital digest in the corresponding block if the digital digest passes the verification. As such, the history data and order data of the target user are stored in the blockchain, and based on the non-tamperability and decentralization characteristics of the blockchain, credibility of the data stored as evidence is improved, a risk of tampering and forging is reduced, and user experience is further improved.

A schematic solution of the blockchain-based data processing apparatus in the embodiments is described above. Notably, the technical solution of the blockchain-based data processing apparatus belongs to the same concept as the technical solution of the previous blockchain-based data processing method. For details of the technical solution of the blockchain-based data processing apparatus not described in detail, references can be made to the description of the technical solution of the previous blockchain-based data processing method.

Figure 6:
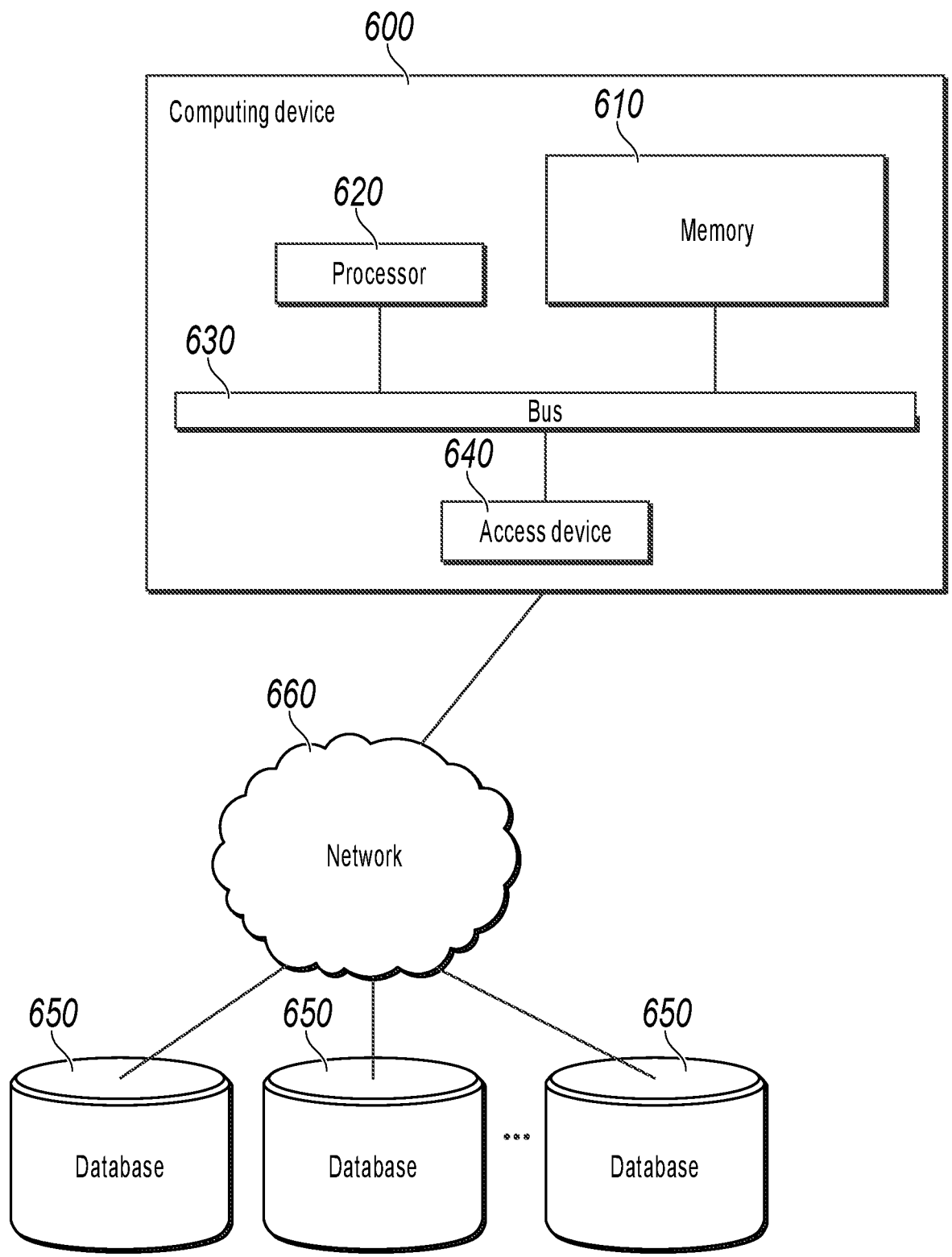
FIG. 6 is a schematic structural diagram illustrating a computing device according to some embodiments of the present specification.

FIG. 6 is a schematic structural diagram illustrating a computing device 600 according to some embodiments of the present specification. Parts of the computing device 600 include but are not limited to a memory 610 and a processor 620. The processor 620 is connected to the memory 610 by a bus 630, and a database 650 is configured to store data.

The computing device 600 further includes an access device 640. The access device 640 enables the computing device 600 to communicate through one or more networks 660. Examples of the networks include a public switched telephone network (PSTN), a local area network (LAN), a wide area network (WAN), a personal access network (PAN), or a combination of communications networks such as the Internet.

The access device 640 may include one or more of any type of wired or wireless network interface (for example, a network interface card (NIC)), such as an IEEE 802.11 wireless local area network (WLAN) wireless interface, a worldwide interoperability for microwave access (WiMAX) interface, an Ethernet interface, a universal serial bus (USB) interface, a cellular network interface, a Bluetooth interface, and a near field communication (NFC) interface.

In some embodiments of the present specification, the previous components of the computing device 600 and other components not shown in FIG. 6 can also be connected to each other, for example, by using a bus. It should be understood that the structural block diagram of the computing device shown in FIG. 6 is only an example, and is not intended to limit the scope of the present specification. A person skilled in the art can add or replace other components as needed.

The computing device 600 can be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses) or any other type of mobile device, or a stationary computing device such as a desktop computer or a PC. The computing device 600 may also be a mobile or stationary server.

The processor 620 is configured to execute the following computer-executable instruction:

obtaining history data of a target user browsing a resource management website and order data of a resource order completed by using the resource management website;

generating, based on the history data and the order data, usage data of the target user using the resource management website; and determining a digital digest of the usage data, and writing the digital digest to a blockchain.

A schematic solution of the computing device in the embodiments is described above. Notably, the technical solution of the computing device belongs to the same concept as the technical solution of the previous blockchain-based data processing method. For details of the technical solution of the computing device not described in detail, references can be made to the description of the technical solution of the previous blockchain-based data processing method.

Some embodiments of the present specification further provide a computer-readable storage medium, where the computer-readable storage medium stores a computer instruction, and when the instruction is executed by a processor, the instruction is used to:

obtain history data of a target user browsing a resource management website and order data of a resource order completed by using the resource management website;

generate, based on the history data and the order data, usage data of the target user using the resource management website; and determine a digital digest of the usage data, and write the digital digest to a blockchain.

A schematic solution of the computer-readable storage medium in the embodiments is described above. Notably, the technical solution of the storage medium belongs to the same concept as the technical solution of the previous blockchain-based data processing method. For details of the technical solution of the storage medium not described in detail, references can be made to the description of the technical solution of the previous blockchain-based data processing method.

Specific embodiments of the present specification are described above. Other embodiments fall within the scope of the appended claims. In some situations, the actions or steps described in the claims can be implemented in an order different from the order in the embodiments and the desired results can still be achieved. In addition, the process depicted in the accompanying drawings does not necessarily need a particular order or successive order to achieve the desired results. In some implementations, multi-tasking and concurrent processing are feasible or may be advantageous.

The computer instruction includes computer program code. The computer program code can be in the form of source code, object code, or an executable file, or some intermediate forms, etc. The computer-readable medium can include any entity or apparatus capable of carrying the computer program code, a recording medium, a USB disk, a removable hard disk, a magnetic disk, an optical disc, a computer memory, a read-only memory (ROM), a random access memory (RAM), an electrical carrier signal, a telecommunication signal, a software distribution medium, etc. Notably, content contained in the computer-readable medium can be appropriately added or deleted according to requirements of the legislation and patent practice in a jurisdiction. For example, in some jurisdictions, according to the legislation and patent practice, the computer-readable medium does not include an electrical carrier signal and a telecommunication signal.

Notably, for ease of description, the previous method embodiments are all described as a combination of a series of actions. A person skilled in the art should know that the present specification is not limited to the order of actions described and that some steps can be performed in another order or at the same time according to the present specification. In addition, a person skilled in the art should also know that all the embodiments described in the present specification are preferred embodiments and that the related actions and modules are not necessarily mandatory to the present specification.

In the previous embodiments, each embodiment has its focus. For parts not detailed in an embodiment, references can be made to related descriptions of another embodiment.

The preferred embodiments of the present specification disclosed above are only intended to help describe the present specification. Optional embodiments do not elaborate on all details, and do not limit the present invention to only the described specific implementations either. Clearly, a plurality of modifications and changes can be made according to content of the present specification. In the present specification, these embodiments are selected and described in detail to better explain the principle and practical application of the present specification, so that a person skilled in the art can understand and use the present specification well. The present specification is limited only by the claims and their full scope and equivalents.

What is claimed is:

1. A computer-implemented method comprising:
    obtaining, by a service platform, order data of an order placed by a target user through a user interface and history data of the target user associated with one or more user interface operations for placing the order, wherein the history data comprises page code of one or more webpages browsed by the target user prior to placing the order;
    generating, by the service platform, usage data of the target user that comprises the history data and the order data;
    determining, by the service platform, a digital digest of the usage data;
    sending, by the service platform, the digital digest to a blockchain network associated with a blockchain, wherein the digital digest is verified by a blockchain node of the blockchain network, and wherein the digital digest is stored on the blockchain in response to a determination that the digital digest passes a verification;
    in response to receiving a backtracking request for backtracking a process of using the user interface by the target user, obtaining, based on the backtracking request, first usage data from a storage space corresponding to the target user;
    determining a target digital digest of the first usage data;
    sending a request for obtaining the digital digest to the blockchain network;
    receiving the digital digest from the blockchain network;
    comparing the target digital digest with the digital digest to generate a comparison result; and
    determining a response result for the backtracking request based on the comparison result.

2. The computer-implemented method of claim 1, comprising:
    receiving an operation request from the target user associated with a current display page of the user interface;
    determining target page code corresponding to the operation request;
    sending the target page code to the target user;
    generating a target key frame based on the target page code and a time of sending the target page code;
    identifying a storage block associated with the one or more user interface operations;
    writing the target key frame to the storage block; and
    updating a record identifier of the storage block.

3. The computer-implemented method of claim 2, comprising:
    receiving an acquisition request from the target user, wherein the acquisition request comprises a user identifier of the target user and a user interface identifier of the user interface;
    determining initial page code based on the user interface identifier;
    sending the initial page code to the target user;
    generating an initial key frame based on the initial page code and a time of sending the initial page code;
    creating the storage block based on the initial key frame; and
    generating the record identifier based on the user identifier and the user interface identifier.

4. The computer-implemented method of claim 1, comprising:
    obtaining a user identifier of the target user by parsing the order data; and
    determining, based on the user identifier, the storage space corresponding to the target user; and
    writing the usage data to the storage space.

5. The computer-implemented method of claim 1, comprising:
    in response to determining that the target digital digest matches the digital digest, parsing the usage data to obtain the history data;
    generating, based on the history data, an operation page indicating an operation of the one or more user interface operations;
    determining behavior information of the target user based on the operation page; and
    performing behavior detection on the target user based on the behavior information to obtain a behavior detection result of the target user.

6. The computer-implemented method of claim 1, comprising:
    in response to receiving the backtracking request, generating, based on the history data, a plurality of operation pages indicating the one or more user interface operations; and
    sorting the plurality of operation pages based on a time sequence of the one or more user interface operations to generate a sorting result; and
    generating an operation page display sequence based on the sorting result.

7. A non-transitory, computer-readable medium storing one or more instructions executable by a computer system to perform operations comprising:
    obtaining, by a service platform, order data of an order placed by a target user through a user interface and history data of the target user associated with one or more user interface operations for placing the order, wherein the history data comprises page code of one or more webpages browsed by the target user prior to placing the order;
    generating, by the service platform, usage data of the target user that comprises the history data and the order data;
    determining, by the service platform, a digital digest of the usage data;
    sending, by the service platform, the digital digest to a blockchain network associated with a blockchain, wherein the digital digest is verified by a blockchain node of the blockchain network, and wherein the digital digest is stored on the blockchain in response to a determination that the digital digest passes a verification;

in response to receiving a backtracking request for backtracking a process of using the user interface by the target user, obtaining, based on the backtracking request, first usage data from a storage space corresponding to the target user;

determining a target digital digest of the first usage data;

sending a request for obtaining the digital digest to the blockchain network;

receiving the digital digest from the blockchain network;

comparing the target digital digest with the digital digest to generate a comparison result; and determining a response result for the backtracking request based on the comparison result.

8. The non-transitory, computer-readable medium of claim 7, the operations comprising:

receiving an operation request from the target user associated with a current display page of the user interface;

determining target page code corresponding to the operation request;

sending the target page code to the target user;

generating a target key frame based on the target page code and a time of sending the target page code;

identifying a storage block associated with the one or more user interface operations;

writing the target key frame to the storage block; and updating a record identifier of the storage block.

9. The non-transitory, computer-readable medium of claim 8, the operations comprising:

receiving an acquisition request from the target user, wherein the acquisition request comprises a user identifier of the target user and a user interface identifier of the user interface;

determining initial page code based on the user interface identifier;

sending the initial page code to the target user;

generating an initial key frame based on the initial page code and a time of sending the initial page code;

creating the storage block based on the initial key frame; and generating the record identifier based on the user identifier and the user interface identifier.

10. The non-transitory, computer-readable medium of claim 7, the operations comprising:

obtaining a user identifier of the target user by parsing the order data; and determining, based on the user identifier, the storage space corresponding to the target user; and writing the usage data to the storage space.

11. The non-transitory, computer-readable medium of claim 7, the operations comprising:

in response to determining that the target digital digest matches the digital digest, parsing the usage data to obtain the history data;

generating, based on the history data, an operation page indicating an operation of the one or more user interface operations;

determining behavior information of the target user based on the operation page; and performing behavior detection on the target user based on the behavior information to obtain a behavior detection result of the target user.

12. The non-transitory, computer-readable medium of claim 7, the operations comprising:

in response to receiving the backtracking request, generating, based on the history data, a plurality of operation pages indicating the one or more user interface operations; and sorting the plurality of operation pages based on a time sequence of the one or more user interface operations to generate a sorting result; and generating an operation page display sequence based on the sorting result.

13. A computer-implemented system, comprising:

one or more computers; and one or more computer memory devices coupled with the one or more computers and having tangible, non-transitory, machine-readable media storing one or more instructions that, when executed by the one or more computers, perform one or more operations comprising:

obtaining, by a service platform, order data of an order placed by a target user through a user interface and history data of the target user associated with one or more user interface operations for placing the order, wherein the history data comprises page code of one or more webpages browsed by the target user prior to placing the order;

generating, by the service platform, usage data of the target user that comprises the history data and the order data;

determining, by the service platform, a digital digest of the usage data;

sending, by the service platform, the digital digest to a blockchain network associated with a blockchain, wherein the digital digest is verified by a blockchain node of the blockchain network, and wherein the digital digest is stored on the blockchain in response to a determination that the digital digest passes a verification;

in response to receiving a backtracking request for backtracking a process of using the user interface by the target user, obtaining, based on the backtracking request, first usage data from a storage space corresponding to the target user;

determining a target digital digest of the first usage data;

sending a request for obtaining the digital digest to the blockchain network;

receiving the digital digest from the blockchain network;

comparing the target digital digest with the digital digest to generate a comparison result; and determining a response result for the backtracking request based on the comparison result.

14. The computer-implemented system of claim 13, the operations comprising:

receiving an operation request from the target user associated with a current display page of the user interface;

determining target page code corresponding to the operation request;

sending the target page code to the target user;

generating a target key frame based on the target page code and a time of sending the target page code;

identifying a storage block associated with the one or more user interface operations;

writing the target key frame to the storage block; and updating a record identifier of the storage block.

15. The computer-implemented system of claim 14, the operations comprising:
- receiving an acquisition request from the target user, wherein the acquisition request comprises a user identifier of the target user and a user interface identifier of the user interface;
- determining initial page code based on the user interface identifier;
- sending the initial page code to the target user;
- generating an initial key frame based on the initial page code and a time of sending the initial page code;
- creating the storage block based on the initial key frame; and
- generating the record identifier based on the user identifier and the user interface identifier.

16. The computer-implemented system of claim 13, the operations comprising:
- obtaining a user identifier of the target user by parsing the order data; and
- determining, based on the user identifier, the storage space corresponding to the target user; and
- writing the usage data to the storage space.

17. The computer-implemented system of claim 13, the operations comprising:
- in response to determining that the target digital digest matches the digital digest, parsing the usage data to obtain the history data;
- generating, based on the history data, an operation page indicating an operation of the one or more user interface operations;
- determining behavior information of the target user based on the operation page; and
- performing behavior detection on the target user based on the behavior information to obtain a behavior detection result of the target user.

* * * * *